United States Patent [19]
Thiel

[11] 3,836,309
[45] Sept. 17, 1974

[54] THERMAL FORMING APPARATUS

[76] Inventor: Alfons Wilhelm Thiel, Uferstrasse 15, Mainz/Rhein, Germany

[22] Filed: Aug. 30, 1973

[21] Appl. No.: 393,170

[52] U.S. Cl.......... 425/383, 425/388, 425/DIG. 48, 425/346
[51] Int. Cl............................................. B29c 17/00
[58] Field of Search............ 425/383, 384, 388, 394, 425/387, 346, 455, DIG. 48

[56] References Cited
UNITED STATES PATENTS

| | | | |
|---|---|---|---|
| 3,193,881 | 7/1965 | Kostin............................ | 425/388 X |
| 3,577,495 | 5/1971 | Pearl et al...................... | 425/384 X |
| 3,632,252 | 1/1972 | Amberg et al.................. | 425/388 X |
| 3,659,993 | 5/1972 | Brown............................ | 425/394 X |
| 3,734,671 | 5/1973 | Talasz............................ | 425/387 X |
| 3,748,078 | 7/1973 | Schott............................ | 425/383 |

Primary Examiner—J. Howard Flint, Jr.
Attorney, Agent, or Firm—Strauch, Nolan, Neale, Nies & Kurz

[57] ABSTRACT

Apparatus for thermal forming of articles in a thermoplastic web includes a thermal forming station wherein one or more die supports are vertically movable in timed relation with web feed, a common power unit being provided to operate a drive system for actuating the web feed intermittently and synchronously moving a die component or components, and adjustments are provided in the drive system for adapting the die action to form deep or shallow articles in the web and for varying the speed and incremental advance of the web.

32 Claims, 10 Drawing Figures

3,836,309 ic system therefore consume excessive

THERMAL FORMING APPARATUS

BACKGROUND OF THE INVENTION

Thermal forming machines are known having drive systems wherein a central shaft provided with a cam or cams is mounted underneath the die supports (U.S. Pat. No. 3,172,159). Cam followers are directly connected to the die supports for performing vertical up-and-down motion movements. These known drive systems suffer from the drawback that the magnitude of the up-and-down motions of the die supports directly generated by the cam via the cam followers is fixed and the lift magnitude must be so set that it will suffice for the forming of articles of such maximum depth as may be made by the machine. Hence the die supports must execute up-and-down motions of great magnitude even when not at all required for the forming of shallow articles. Thermal forming machines equipped with the known drive systems therefore consume excessive power, the work rate may not be increased when manufacturing shaped articles of shallow depth, and the large amplitude up-and-down motions of the die supports produce unnecessary impacts in the operation of the machine.

SUMMARY OF THE INVENTION

The invention overcomes the foregoing difficulties by providing a drive system for thermal forming machines that is adaptable to the particular requirements of the shaping process, and wherein the work rate as welll as the smoothest operation of the machine may be set optimally, and this is the major object.

The invention provides novel adaptation apparatus for amplitude setting in the drive system, between the cam(s) and power unit on the one hand and the die supports on the other hand and this is a further object of the invention.

It is a further object of the invention to provide a die support actuating mechanism comprising in novel combination a cam operated output lever connected as by a link to a rockable lift lever operatively connected to at least the lower die support, with provision in such mechanism for adjustment of amplitude of die movement for the optimum setting in the manufacture of articles of particular shape or different depth. The mechanism of the invention provides the advantage of allowing changing the work rate either by altering the speed of the drive motor or by other adjustments at the power unit. The work rate of the apparatus may be appreciably increased, in particular, if the die supports need only execute up-and-down motions of slight magnitude. By changing work rate and magnitude of up-and-down motions, the apparatus of the invention may be set for optimally smooth and rapid operation, while conserving power.

It is a further object of the invention to provide a drive system of the foregoing type wherein the output lever is pivoted and spacing between that pivot and a pivot connection to the lift lever connected link is adjustable. The link may be pivoted by means of an eccentric shaft or a movable sliding block at either end, and the drive system is characterized by a specially simple and effective adjustability of the amplitude of the up-and-down motion of the die support.

A further object of the invention addresses itself to further appreciably improving the smoothness of operation of a thermal forming machine with a drive system of the foregoing kind by providing a cam composed of two cam elements driven in common and by providing the output lever with follower elements such as rollers, one in constant contact with each cam element.

A further object of the invention aims at further appreciably improving the smoothness of operation of a thermal forming machine of the above described kind by mounting a weight compensating device having at least one power storage or damping element at a die support. This weight compensating device may contain at least one, preferably two, pneumatic or hydraulic power storage cylinders mounted diagonally to the die support and the pressure in the cylinders may be adjustable.

A further object of the invention lies in providing a drive system of the foregoing kind which is equipped with upper and lower die supports both of which are frictionally connected to the lift lever, and where the frictional connection of the upper die support may be changed to selectively reverse the lift to obtain opposite phase drive with respect to the lower die support or to obtain a motionless condition of the upper die support.

A further object of the invention lies in providing a drive system for thermal forming machines having lower and upper die supports where a shaft supporting a lift device connected to the die supports is equipped with at least one crankshaft-pin and the shaft is provided with an associated concentric pin that can be retracted axially into the shaft, whereby a lift rod connected to the upper die support may be selectively emplaced at its lower end on the crankshaft-pin or on the concentric pin in its out of the shaft extended position.

A further object of the invention lies in providing a novel compact common drive system for thermal forming machines and associated apparatus for feeding and conveying thereto the web to be thermally formed and apparatus for removing the web holding the formed articles therein, such system having a common power unit driving related cams for continuous and intermittent web feed synchronized with die movements in the machine.

A further object of the invention comprises a novel power unit for a thermal forming machine containing at least one web advance-motion cam driven synchronously with a die support lift-cam and adapted for intermittent driving of a sprocket wheel for moving the drive chain of a web conveying device.

A further object of the invention provides in a power unit of the foregoing kind a pair of web advance cam plates and a sensor wheel with two pairs of sensor elements mounted on the shaft of the sprocket wheel, where said sensor elements preferably are equipped with sensor-rollers each pair of which alternately will contact the advance cam plates.

It is a further object of the invention to provide novel equipment for the manufacture of thin-walled, thermoplastic shaped articles comprising means for feeding and conveying a thermoplastic web, means for tempering the web to a temperature suitable for thermal forming, a thermal forming machine for shaping articles within the web by deep drawing or stamping, said thermal forming machine comprising at least one vertically movable die support, and means for cutting the shaped articles out of the web; wherein correlated drive devices are provided for the thermal shaping machine and the web feeding and conveying devices including motor driven cam mechanism for those devices provided with arrangements for adjusting the up-and-down motion of the die supports to the size of the articles to be formed and adjusting the feeding and conveying motions of the web to the length and properties of the web sections required for each operational phase of the thermal forming machine.

A further object of the invention is to provide novel equipment for the manufacture of thin-walled thermoplastic formed articles having devices for the continuous feeding and conveying of a web of thermoplastic material, means for the continuous tempering of the web to a temperature suitable for thermal shaping and devices for converting continuous web feeding motion into intermittent for stopping a web section in a thermal forming machine for shaping the molded articles in the web by deep drawing or stamping, the thermal forming machine comprising at least one vertically movable die support, and a common drive system for the thermal forming apparatus and the foregoing devices wherein rotational motion from a motor is converted by means of cams or the like into up-and-down motion of the die support and wherein these drive devices are adjustable for adapting them to the desired size of the shaped articles and so that the feed motions of the web may be set for the required web length and web properties at each particular operational phase of the thermal forming apparatus.

Another object of the invention is to make use of a drive system of the foregoing kind in a thermoforming line for the manufacture of thin-walled shaped articles, the thermoforming line being provided with a compensating roller device for converting continuous feed of the web into stepwise advance, the power unit of the system being connected to drive the web continuously at one side of the compensating roller device and connected for stepwise advance of the web at the other side of the compensating roller device. In view of the particularly smooth operation achieved in the invention employing this drive system, it is feasible to continuously handle even relatively delicate webs coming directly from an extrusion device and to feed them stepwise into the shaping station.

Another object of the invention to make use of a drive system of the foregoing kind containing, in addition to devices for converting the continuous feeding of the web into stepwise advance, further devices for pretreating the web, for instance calendar, cooling rollers etc., which will be continuously driven by the power unit of the system.

Further objects of the invention will appear in connection with the following description, the appended claims and the annexed drawings.

Figure 1:
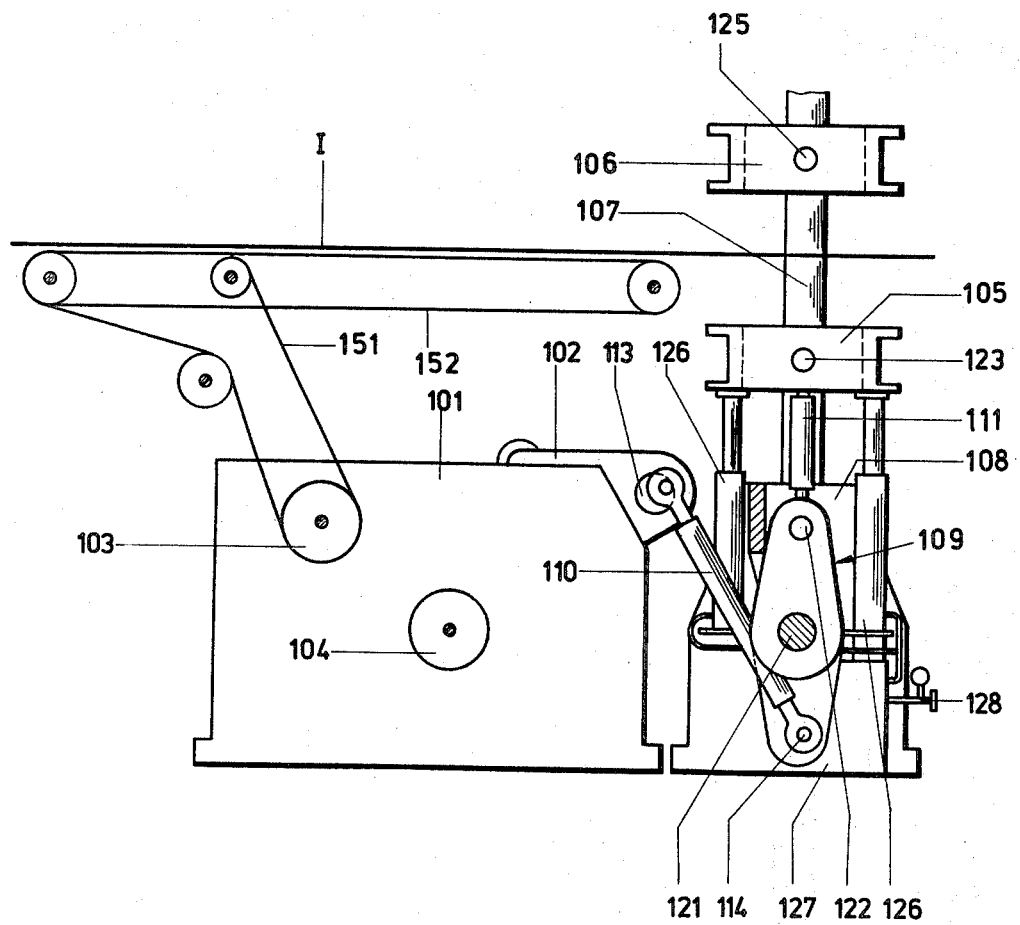
FIG. 1 is a side elevation partly in section showing a drive system for thermal forming means according to one embodiment of the invention.

Referring first to FIGS. 1-7, the main drive for the thermal forming apparatus comprises a cam and gear unit 101 powered by an electric motor (not shown). An output lever 102 controlled by cams inside the unit as will appear actuates the forming dies, and output sprockets 103 and 104 respectively provide sources of intermittent and continuous web movements as will be described in detail. Vertically movable on one or more stationary columns 107 rigid with the machine frame 108 are a lower die support 105 and an upper die support 106, and the composite web passes between them to be intermittently stopped for the article forming operation. The dies or tools (not shown, but known per se) may be mounted on the supports 105 and 106, or other suitable shaping devices may be provided there.

Lever 102 is pivoted on fixed axis at 120, and is connected by an eccentric pivot 113 to one end of a link rod 110. The other end of rod 110 is connected by an eccentric pivot 114 to one end of a lifter lever 109 pivoted intermediate its ends on a fixed axis shaft 121. The other end of lever 109 is connected by pivot 122 to the lower end of a lift rod 111, and the upper end of rod 109 is connected by pivot 123 to the lower die support 105.

Figure 2:
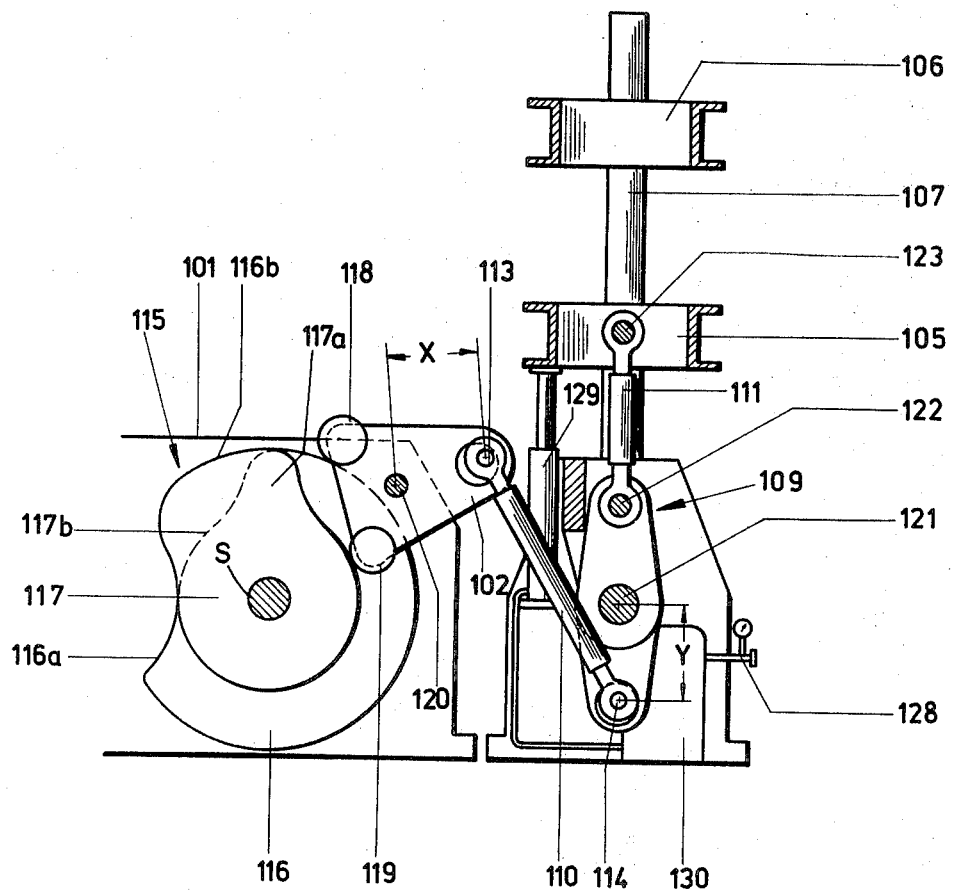
FIG. 2 is a side elevation partly in section showing the drive system for thermal forming means with some modification.

Referring to FIG. 2, output lever 102 carries at opposite corners a pair of cam follower rollers 118 and 119 that respectively engage cams 116 and 117 of a cam assembly 15 mounted on a shaft S continuously driven by the electric motor. Rotation of shaft S causes selective cyclic rocking of lift lever 109 during the forming operation, the nature of the rocking movement being controlled by cams 116 and 117 as will be described.

Figure 3:
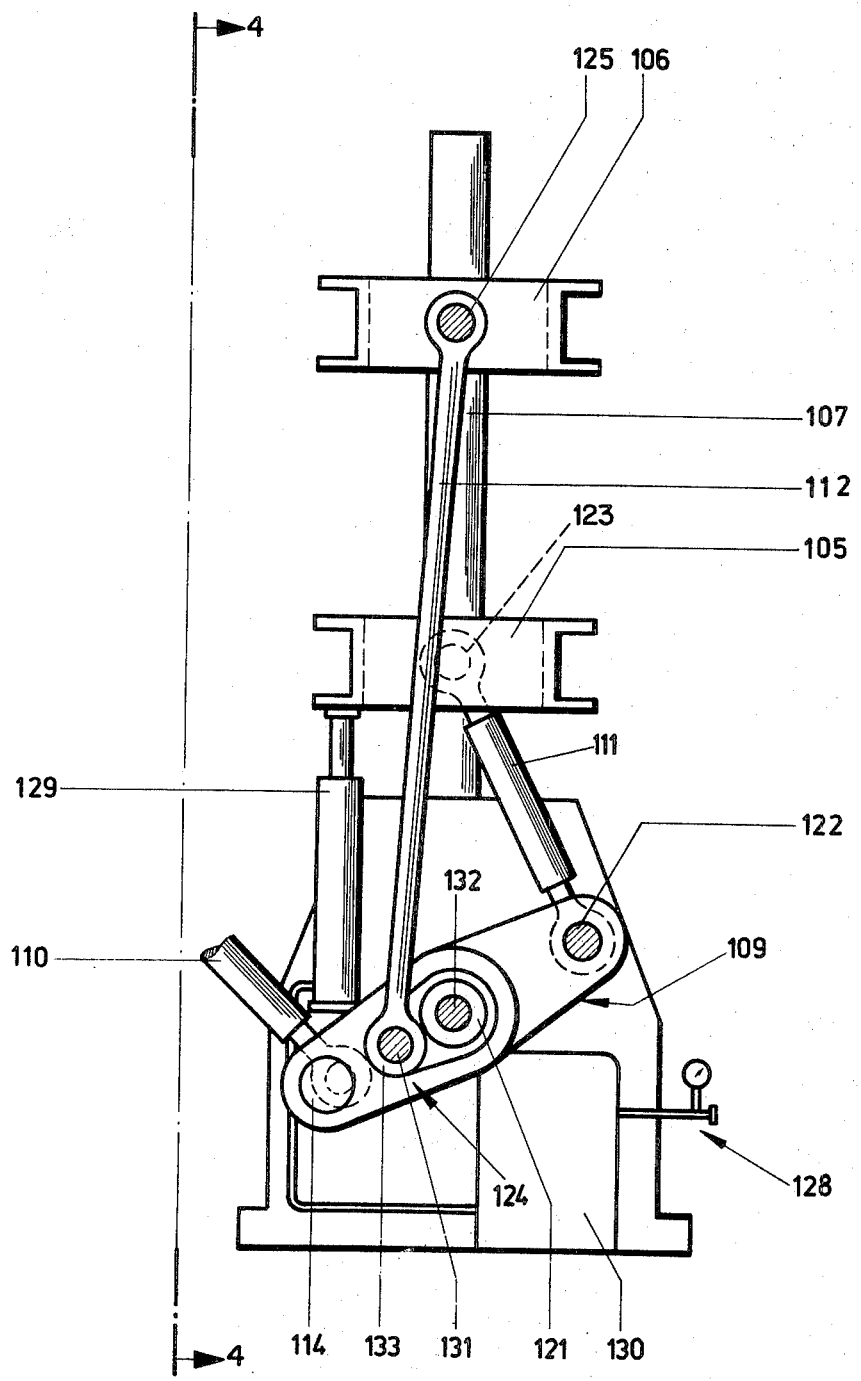
FIG. 3 is a side elevation showing a portion of the drive system of FIG. 2 in another position.

As shown in FIG. 3 where an upper vertically movable die support is used, a second lift rod 112 extends between a pivot connection 124 at one end to lever 109 and a pivot connection 125 at the other end to upper die support 106. The cams 116 and 117 in such case will cause selective cyclic reciprocation of upper die 106.

The eccentric pivot connections at 113 and 114 are adjustable as will later be described in detail with respect to FIGS. 6 and 7. As shown in FIG. 2 adjustment of eccentric pivot 113 may vary the length of effective lever arm X between pivots 113 and 120 of lever 102, while adjustment of eccentric pivot 114 may vary the length of effective lever arm Y between pivots 114 and 121 of lift lever 109.

If lever arm X is set at its maximum length and lever arm Y is set at minimum length, such will result in maximum lift of die supports 105 and 106. If lever arm X is set at minimum length and lever arm Y is set at maximum length, such will result in minimum lift of the die supports.

The lift range may be continuously adjusted between minimum and maximum. By selecting the eccentric magnitudes with respect to the minimum values for the lever arms X and Y, the range of the lift adjustment may be determined. In a current machine, a lift adjustment in the ratio of 1:1 ½ minimum: maximum is used.

The location of cam follower rollers 118 and 119 and the contours of cam disks 116 and 117 are so determined with respect to one another that the cam follower rollers will always be in contact with the peripheral surfaces of the respective cam disks during operation. When roller 118 enters a radially recessed part 116a of its cam 116, roller 119 will be in contact with a radially projecting part 117a of its cam 117. Roller 119 proceeds inversely on a radially recessed part 117b of its cam 117 when roller 118 runs on a radially projecting part 116b of its cam 116. In operation the movements of lever 102 under cam control are transmitted through eccentric pin 113 to link rod 110 which in turn acts through eccentric pivot 114 to rock lifter 109 and actuate the die supports. Cam 115 is continuously rotated by the electrical motor, while the vertical motion of die supports 105 and 106 is solely determined by the peripheral shape of cam disks 116 and 117. Operational synchronism of die supports 106 and 106 may be varied by a continuously adjustable speed reducer inserted between the motor and cam 115, or by changing the motor speed.

To achieve self-locking performance of the dies, shaft 121, pivots 122 and 123 of lift rod 111, and pivots 124 and 125 should be in a single, preferably vertical, plane in the closed position of the dies as shown in FIG. 2. To achieve this, link rod 110 is adjustable in length, so that for any adjusted position of eccentric pivots 113 and 114, the desired self-locking position of the parts may be set when the die is closed. So as to have the capability of setting die support 105 for closed die position, lift rod 111 is also adjustable in length. Lift rods 112 also may be made adjustable in length as required.

Figure 4:
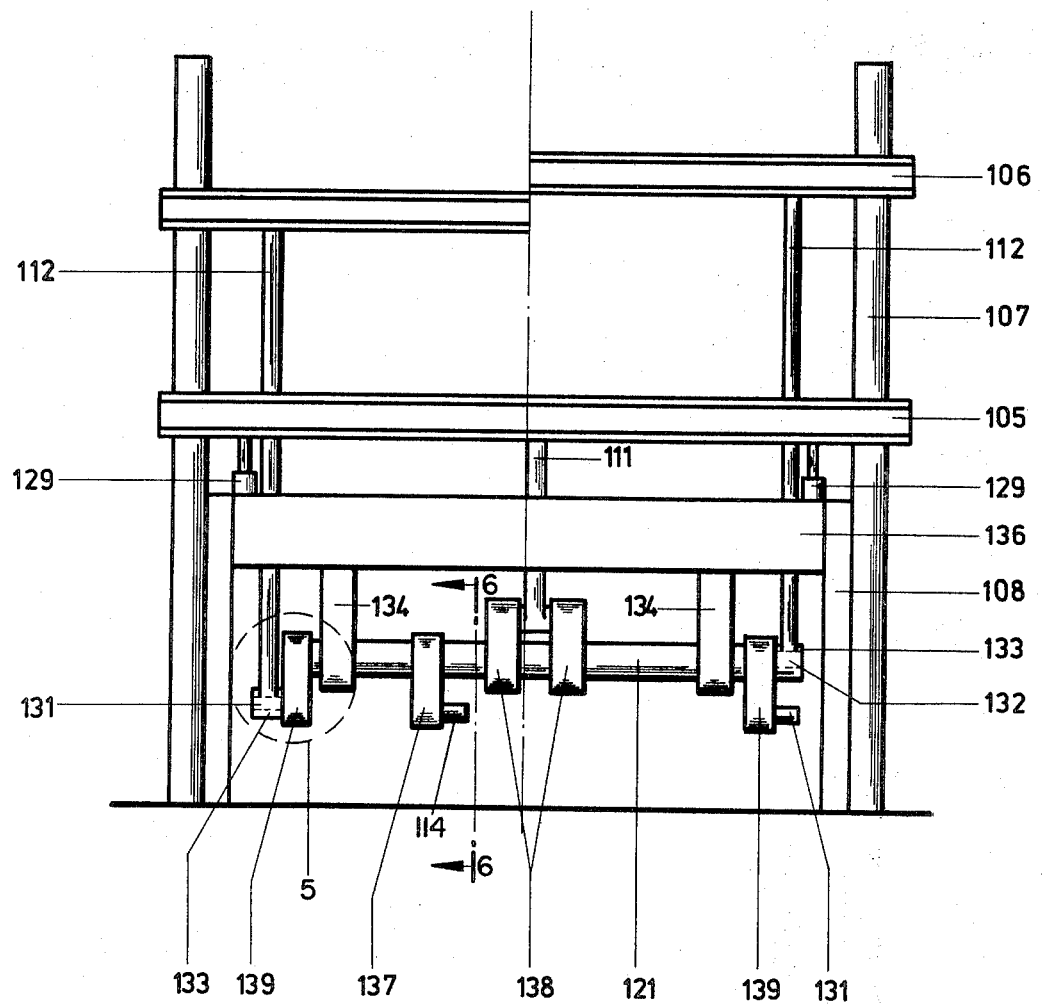
FIG. 4 is an end elevation substantially in the direction of line 4—4 of FIG. 3.

To prevent the generation of shocks during the vertical motions of die support 105 upon the die parts or auxiliary equipment mounted thereon, and to prevent such shocks from being reflected into the unit 101 and from interfering with the smooth operation of the machine and its drive, a weight compensation or shock absorbing system has been provided which has at least one power-storage element that reaches below the lower die support 105. This weight compensating device in the example of FIG. 7 comprises four compressed air cylinders 126 reaching below the four corner areas of lower die support 105 which are connected in parallel to a compressed air source 127 that may be set for controlled supply or removal and measurement of the pressure to the desired pressurization by means of apparatus 128. Compressed air cylinders 126 together with the pressurized air source provide a power storage, braking and damping in a definite manner determined by the selected pressure in source 127, the downward motion of die support 105, while supporting its upward motion, the transmission of damaging shocks thus being prevented. As shown in FIG. 2, the weight compensation device may instead be provided with hydraulic cylinders 129 connected to a hydraulic pressure source container 130 operating in concert with an air cushion. Hydraulic pressure container 130 is also provided with an apparatus 128 for selectively setting the pressure of the shock absorbing cushion. Usually there are only two hydraulic cylinders 129 below the lower die support 105, in diagonal arrangement as indicated in FIG. 4. However, as in FIG. 7, four such cylinders may be provided. It is also conceivable that only one hydraulic or pneumatic cylinder be used, which might be mounted centrally below the lower die support. As shown by FIGS. 7 and 2, the piston rods of the hydraulic or pneumatic cylinders (126,129 respectively) will only engage the lower side of the lower die support 105. One may therefore readily also operate without any weight compensating device by removing the pressures in sources 127 or 130. Also, the pressure in the said sources may be selected so low that there will be some braking and damping action, but that the upward motion of die support 105 will be faster than that of the piston rods so that the upward motion of die support 105 for the purpose of die closing will not be affected by the shock absorbing or damping cylinders. A pressure valve allows operating the apparatus almost weightlessly, that is, for constant pressure applied to the pistons of the compensating cylinder, the same force for the same weight will always be obtained.

In the embodiments of FIGS. 7–10, the thermal forming apparatus is provided with vertically movable lower and upper die supports 105 and 106. Basically, the invention is of significance also for machinery with only one of the die supports vertically movable and coacting with opposite fixed support cross bars. However, in the embodiments shown, a thermal forming machine that may be universally used is provided, which is equipped with lower and upper die supports 105 and 106 that may be moved vertically, that may be selectively fixed, or that may be moved in opposite phase with respect to one another.

Figure 5:
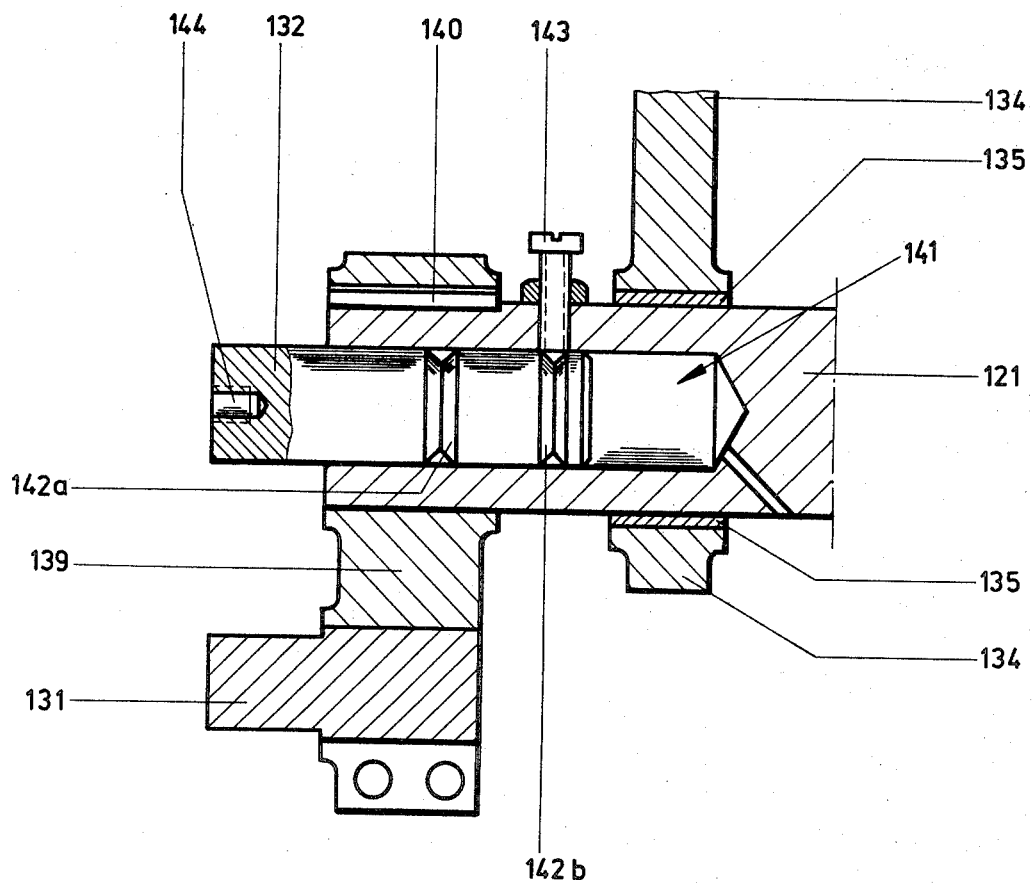
FIG. 5 is a fragmentary view in axial section through the region marked 5 in FIG. 4.

To that end a frictional connection may be provided between lifter lever 109 and die support 106. As shown in FIG. 5 fixed pivot shaft 121, which is journalled at 135 in a bearing mount 134 that is secured (FIG. 4) upon a stationary frame cross bar 136, carries a crank 139. A key or wedge 140 locks crank 139 nonrotatably to shaft 121. Shaft 121 is formed with a recessed end bore 141 in which is slidably frictionally mounted a concentric pin 132 having axially spaced annular grooves 142a and 142b. Pin 132 may be slidably set either in the extended position shown in FIG. 5 or a recessed position in bore 141 with detent screw 143 engaging in either groove.

A crankpin 131 is mounted on crank 139 in eccentrically spaced relation to shaft 121.

Lift rod 112 may be mounted selectively by its lower eyelet 133 on crankpin 131 or on the concentric pin 132. If lift rod 112 is to be mounted on crankpin 131, the concentric pivot 132 must be retracted into shaft 121. As shown in FIG. 3, the arrangement of the link points 122 and 131 with respect to shaft 121 then causes upper and lower die supports 106 and 105 respectively to move vertically out of phase with respect to each other. The lift range of the vertical motion of upper die support 106 as compared to that of the lower die support 105 will then be determined by selecting the spacing of link points 122 and 131 with respect to shaft 121. Varying the lift range of upper die support 106 occurs in the above described manner together with the variation of the lift range of the lower die support 105.

If lift rod 112 is mounted by its lower eyelet 133 on the pivot 132 axially protruding concentrically from shaft 121, during shaft rotation the pivot 132 will rotate only within the eyelet 133 and the upper die support will remain in one position.

If the upper die support 106 is moved out of phase with the lower die support 105, then the weight to be compensated is appreciably less and appreciably less pressure need be set for the hydraulic source 130 (or for the compressed air source) than is the case when operating with the upper die support stationary.

Referring to FIG. 4, in this embodiment link rod 110 is pivotally connected to a pivot on a lever arm 137 fixed near the center region of shaft 121. A pair of second lever arms 138 is rigidly mounted on shaft 121 near the first lever arm 137 and lift rod 111 has its lower eyelet pivotally supported between the two lever arms 138 eccentrically to shaft 121. If desired, two or more pairs of lever arms 138 may be provided. A crank 139 with a crankpin 131 and a concentric pivot 132 as above described in bore holes 141 is mounted in at each end of shaft 121. Each lift rod 112 is placed by its lower eyelet 133 on crankpin 131 in the lower part of FIG. 4, while to the right, lift rod 112 is shown mounted by its lower eyelet 133 alternatively on the concentric pivot 132.

As shown in FIG. 5, crankpin 131 is inserted in an end-slitted crank 139 and fastened there by drawing the ends together. Crank 139 is fixed upon the end of shaft 121 by the wedge or key at 140.

Pin 132 is provided with a concentric front inner threaded bore 144, into which a tool may be screwed for extracting the pivot pin from bore hole 141 and if necessary also for introducing the pivot pin into that bore hole. The threaded bore hole 144 further may be used to mount a locking washer on pivot 132 to hold rod 112 thereon when lower eyelet 133 of lift rod 112 is placed on pin 132.

Figure 6:
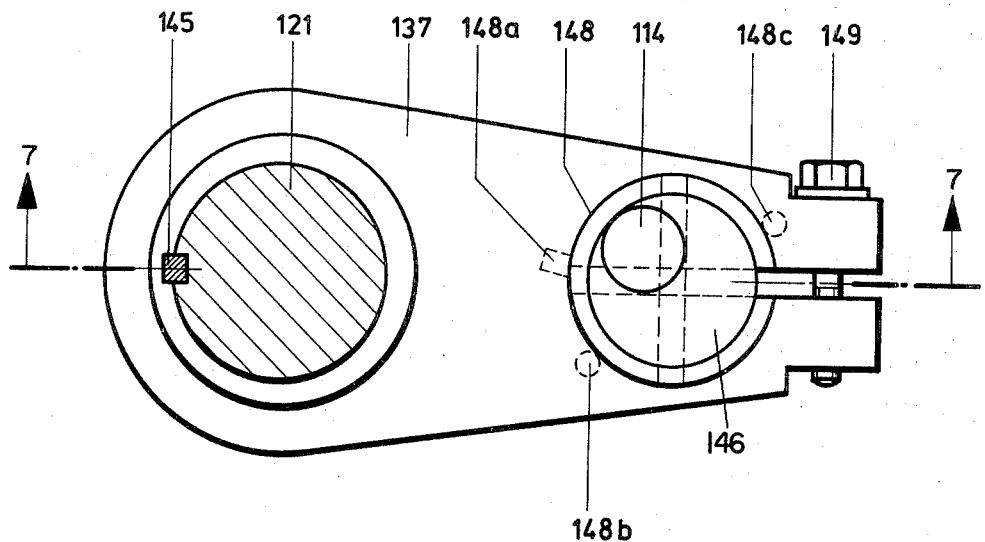
FIG. 6 is a section substantially along line 6—6 in FIG. 4.
Figure 7:
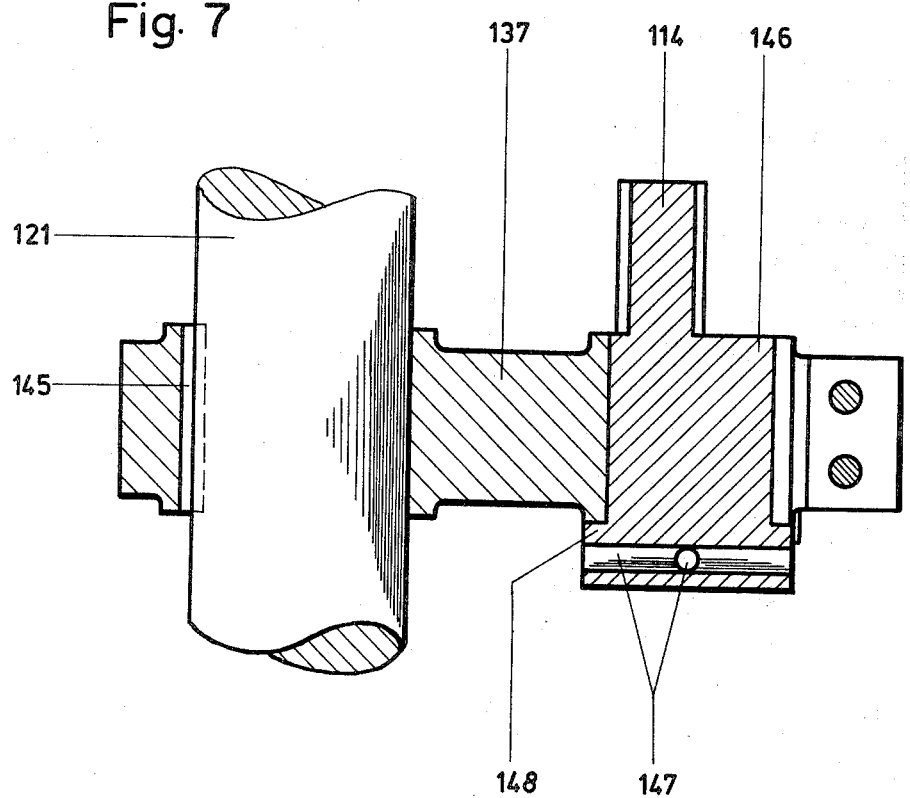
FIG. 7 is a section substantially on line 7—7 of FIG. 6.

FIGS. 6 and 7 show the structural detail of the lever arm 137 which is fixed to lift shaft 121 as by key 145. Lever arm 137 is slotted at its free end to receive an eccentric pivot stud 146. Eccentric pivot 114 extends eccentrically from one end of the stud. Stud 146 is provided at the end opposite the eccentric pivot with an enlarged flange 148 provided with two or three through passages 147 for the use of a tool for rotating the stud and with a radially protruding positioning pin 148a. Counter-positioning pins on lever arm 137 function to limit rotary displacement of the stud 146 by acting as stops for the positioning pin 148a. Counter-positioning pin 148b is a stop for the maximum position (smallest lever arm) and counter-positioning pin 148c is a stop for minimum position (largest lever arm). Positioning pins for setting maximum or minimum positions may also be mounted. Clamp 149 at the end of first lever arm 137 may be loosened for rotating the stud for adjustably setting eccentric pivot 114.

Figure 8:
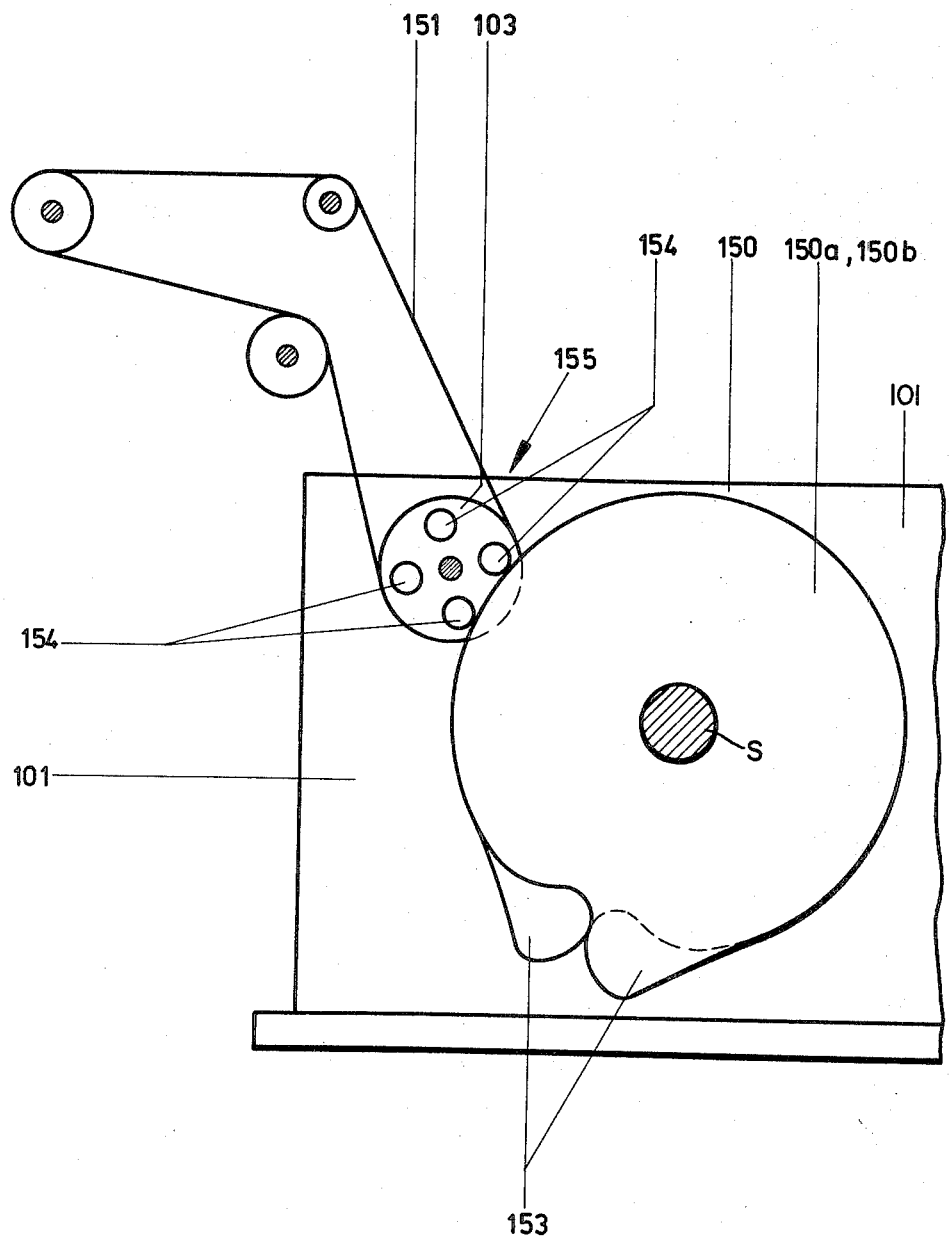
FIG. 8 is an end view somewhat diagrammatically showing the cam and gear unit of the system of FIG. 1.
Figure 9:
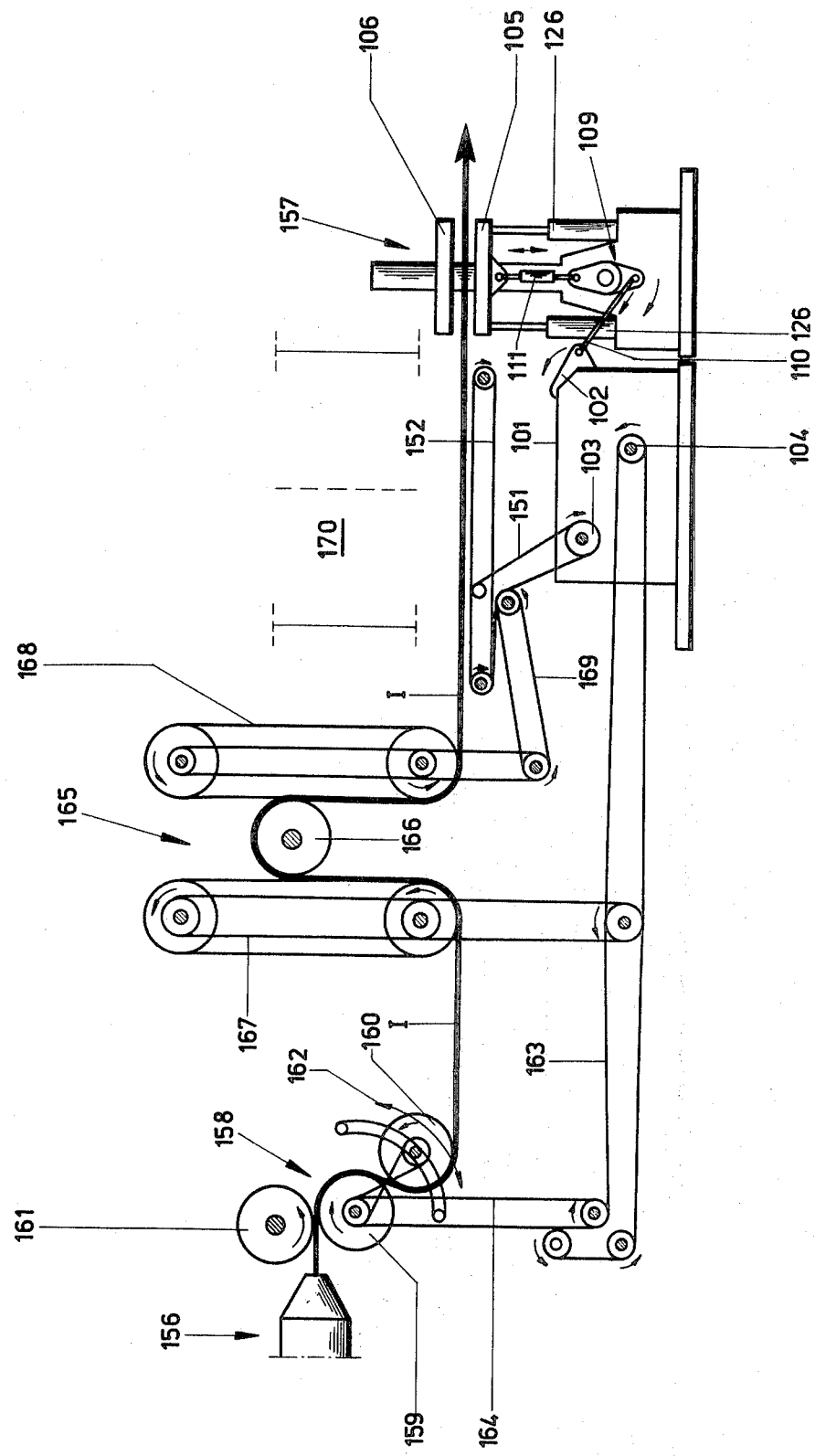
FIG 9 is a diagrammatic side elevation showing a drive system for a thermal forming device in association with a thermoplastic web casting machine for producing the web to be shaped.

As shown in FIG. 8, the cam and gear unit 101 comprises also a synchronously driven web advance cam 150 on shaft S which intermittently drives the sprocket wheel 103 which in turn intermittently drives chain 151 of the web transport device 152 (see FIGS. 7 and 9). Advance cam 150 consists of a pair of advance cam disks 150a and 150b. Each of these is provided with a projection 153 of same design but opposite orientation. A pair of contacting elements, preferably cam follower rollers 154 on a rotatable member 155, engage the advance cam disks 150a, 150b. Member 155 is mounted on the same shaft as sprocket 103. The arrangement of follower rollers 154 is such that each roller of a pair moves on the surface of one of the cam disks. When a projection 153 of a particular advance cam disk moves against a roller 154, member 155 will rotate until projections 153 of both cam disks have passed the pair of contacting rollers 154. That pair of rollers move away from the advance cam disks 150a and 150b during rotation of member 155 and the contacting rollers 154 of the other pair will now engage the peripheral surface of the cam disks 150a and 150b. This effects a 180° rotation of member 155 and therefore sprocket 103. The follower rollers 154 of the second pair then will now move along the peripheral surface of cam disks 150a and 150b until projections 153 again enter their range. No further rotation of member 155 will occur until then. Only when projections 153 pass rollers 154 will there be another rotation of member 155 by 180°. Because of the synchronous driving relation of both the advance cam 150 and lift cam assembly 115, an advance will be generated each time in this manner for the web to be shaped when the die is opened, that is when die supports 105 and 106 have moved apart (FIG. 2) and when therefore, the die being in the open-phase, the formed articles may pass on.

FIG. 9 shows the drive of the invention for a thermal shaping machine 157 following a plastic web extruder 156. A cooling and stabilizing device 158 is connected to the plastic extruder, comprising an idle counter-pressure roller 161 functioning together with the first cooling roller 159 to pass the extruded web. The second cooling roller 160, as shown by double arrow 162, may be adjusted with respect to roller 159, in order to vary the looping angle of the web around both cooling rollers 159 and 160. Roller 159 is continuously driven from the continuously rotating sprocket wheel 104 of the cam and gear unit 101, as by the chain drive connection 163,164.

A motion converter is connected to follow the cooling and stabilizing device 158 and comprises an upward moving compensating roller 166. Compensating roller 166 is held in a continuous chain arrangement 167 on its input side facing the spray-casting device 156, that chain being driven from the continuously running chain linkage 163. On the output side facing the thermal shaping machine 157, compensating roller 166 moves in an intermittently operating chain arrangement 168 which is driven in turn through drive 169 connected to intermittently operating chain 151 of advance device 152 illustrated in FIG. 8. Because of the continuous drive of the chain arrangement 167, the compensating roller will be steadily lifted in accordance with the supply of the continuously moving web, as long as the intermittently operable advance device 152 is stationary. When the thermal shaping machine 157 operational sequence actuates the web advance device 152, the second chain arrangement 168 of the compensating roller will also start running and this causes the compensating roller to be lowered in proportion to the web section to be supplied to the thermal shaping machine 157. The total web advance is the same for both kinds of motion. This is ensured by design of the drive devices of the cam and gear unit connected to sprocket wheels 103 and 104.

FIG. 9 shows an upwardly biased (springs not shown) compensating roller 166. Motion converter 165 takes up the continuously supplied web arriving at constant average speed as compensation roller 166 moves upward, also overcoming the web inherent weight. During intermittent withdrawal of the web, the more or less jerky motion occurs downward, that is, in the direction of the inherent weight of the web due to gravity.

As shown by FIGS. 9, the intermittently operating conveying device 152 for the web may be of such length upstream of the thermal shaping machine 157 that if necessary a temperature compensation dwell station 170 may be placed between motion converter 165 and thermal shaping machine 157. This compensation and stopping station 170 may be of such length as to correspond to a single section or to several sections of an advance step of the web effected by belt 152.

Figure 10:
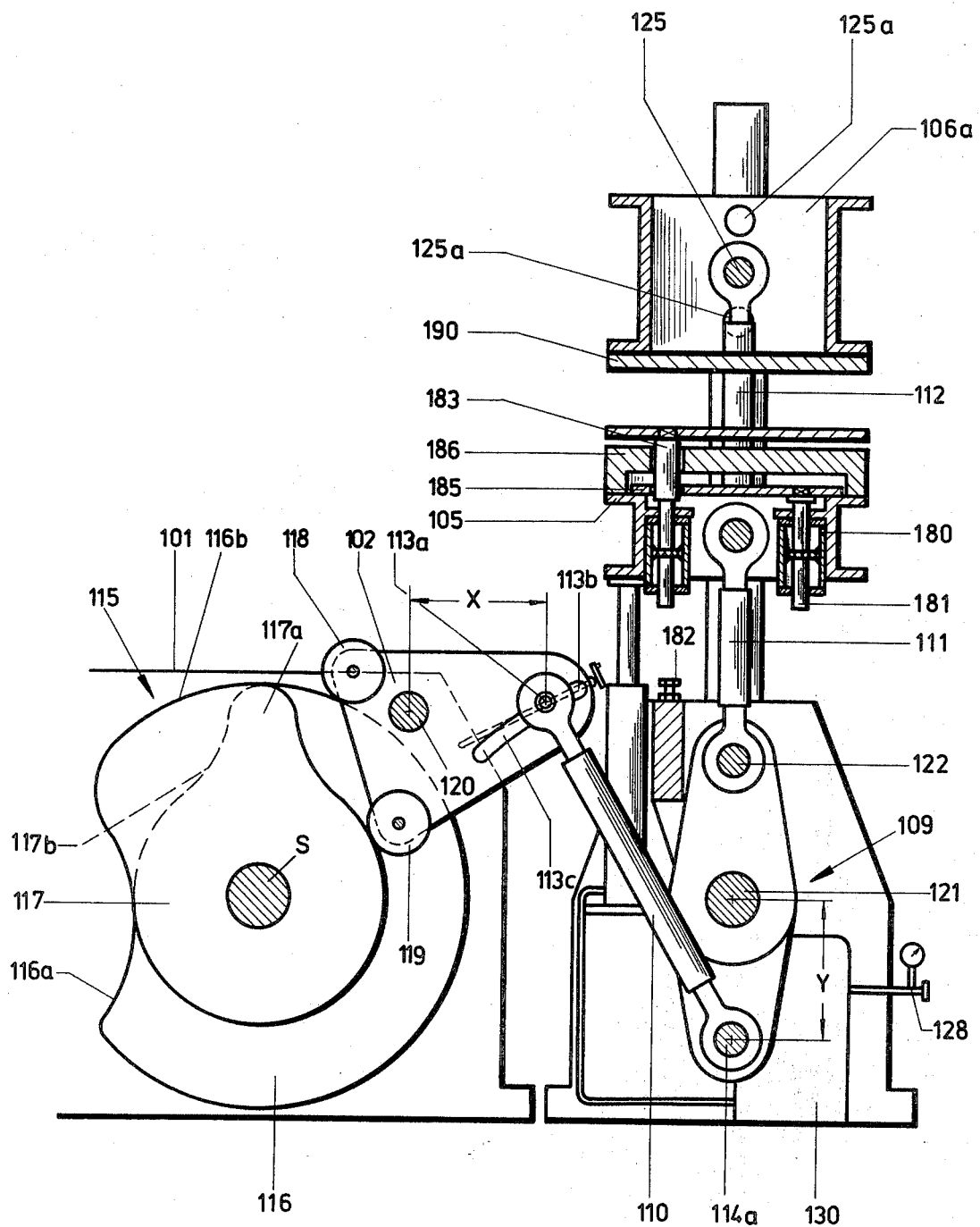
FIG. 10 is a side elevation partly in section showing a thermal forming means that is a variation of that of FIG. 2.

FIG. 10 shows an embodiment of a thermal shaping machine, which is similar to that of FIG. 2. The same reference numerals are used as in FIG. 2 for similar parts. The following modifications exist with respect to FIG. 2:

1. In FIG. 10, the lift adjustment is not made by eccentric pivots as in FIG. 2, but instead by adjustment of a block 113a mounted for slidable displacement along a guide slot 113c in lever 102.

Adjustment of block 113a which is pivotally connected to link rod 110 is achieved by a threaded spindle 113b. The disclosed arrangement of sliding block 113a on lever 102 provides the advantage of a longer adjustment path and also of a more rapid and continuous setting of the lift path. At the dwell state shown in FIG. 10, slot 113c extends along a circular arc about the axis of the stud bearing at 114a which is similar to stud 146, so that the rest state of lifter 109 will remain unaffected by adjustment of block 113a. In order to still further enlarge the range of lift adjustment, the stud bearing 114a shown in FIG. 10 may also be provided with a sliding adjustment (indicated but not shown), by means of which the spacing Y between stud bearing 114a and axis of shaft 121 may be varied.

2. FIG. 10 shows the upper die support 106a with several, for example, three bore holes 125a vertically aligned one above the other. The pivot 125 of lift rod 112 may be placed in any of those holes 125a to locate upper tool 190 at various heights. (FIG. 10 shows a tentering frame as an example of an upper tool 190).

3. The embodiment of a thermal shaping machine shown in FIG. 10 is provided with two pressure cylinders 180, preferably pneumatic, that are double-acting and located at the lower die support 105, and they eliminate conventional ejector springs. Such ejector springs on account of their bulk requirements in the tools, the difficulty in determination their moments of force, their usually constant and uncontrollable pressure and the fact that they require changing for different tools, may be disadvantageous. On the other hand, the double acting pressure-cylinders 180 act as ejectors and peel-off cylinders to provide the advantage of lesser bulk, being mounted outside the tool, and further allowing adjustment to the moment of force required in a particular arrangement. Also, the cylinders need not be replaced for different jobs. The piston rods 181 may be used as automatic ejectors. All operational parts previously located inside a tool employing springs will be on the side of the machine when the double acting cylinders are used, and tool simplication results.

Furthermore, the cylinders may perform various tasks. For instance two cylinders may be used as automatic ejectors when combined with adjustable registers 182 by means of actuating rods 183, while one or two further cylinders are used for forming shallow bottoms as indicated by the actuation plate 185 in the lower part of the die part 186.

The foregoing three modifications of FIG. 10 may be used together or independent of each other. They may be used individually or together in any embodiment of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by letters Patent is:

1. Thermal forming apparatus including a forming station having at least one vertically movable die support, feed means for advancing a web in which articles are to be formed into said station and for removing the web with the articles formed therein from the station, and means for effecting up and down operative motion of said die support in synchronism with web advance comprising power driven cam means, a lift lever pivotally mounted on a first fixed axis below said die support and operatively connected to said die support and motion transmitting means connected between said cam means and said lift lever for effecting periodic rocking of said lift lever.

2. Apparatus as defined in claim 1, wherein said motion transmitting means is adjustable for varying the magnitude of said up and down movement.

3. Apparatus as defined in claim 1, wherein motion transmitting means comprises a rockable lever pivoted on a second fixed axis parallel to said first fixed axis periodically activated by said cam means and a link pivoted at opposite ends on said rockable lever and said lift lever.

4. Apparatus as defined in claim 3, wherein means is provided for adjusting the pivotal connection between said rockable lever and said link for varying the effective lever arm between said second fixed axis and said pivotal connection.

5. Apparatus as defined in claim 3, wherein means is provided for adjusting the pivotal connection between said lift lever and said link for varying the effective lever arm between said first fixed axis and said pivotal connection.

6. Apparatus as defined in claim 3 wherein said link is adjustable in length.

7. Apparatus as defined in claim 3, said lift lever is a dual arm lever rockable about said first fixed axis, said link is pivotally connected to said lift lever at one side of said first fixed axis and the connection between the lift lever and die support is a member pivoted at opposite ends to said die support and the lift lever at the other side of said fixed axis.

8. Apparatus as defined in claim 7, wherein the pivotal connection between the link and lift lever, the lift lever and said member, and said member and the die support lie substantially in a vertical plane containing said first fixed axis in the closed position of said die support.

9. Apparatus as defined in claim 1, wherein said cam means comprises two axially spaced cams having operational formations in predetermined circumferential spacing and said motion transmitting means comprises a rockable lever pivoted about a second fixed axis parallel to said first fixed axis and having spaced cam followers engaging the respective cams.

10. Apparatus defined in claim 9, wherein said motion transmitting means comprises an adjustable length link pivoted at opposite ends to said levers, and the connection between said lift lever and die support is an adjustable length member pivoted at opposite ends on said lift lever and said die support.

11. Apparatus as defined in claim 4, wherein said adjustable connection comprises a rotatably adjustable eccentric pivot.

12. Apparatus as defined in claim 4, wherein said adjustable connection is a pivot adjustably slidable along a concentric path concentric with the pivot between the link and the lift lever.

13. Apparatus as defined in claim 5, wherein said adjustable connection is a rotatably adjustable eccentric pivot.

14. Apparatus as defined in claim 5, wherein said adjustable connection is a pivot adjustably slidable along a circular path concentric with the pivot between the link and the rockable lever.

15. Apparatus as defined in claim 1, comprising shock absorbing means for damping operational movements of said die support.

16. Apparatus as defined in claim 15, wherein said damping means comprises at least one fluid pressure cylinder underlying said die support.

17. Apparatus as defined in claim 15, wherein said damping means comprises a plurality of fluid pressure cylinders underlying said die support.

18. Apparatus as defined in claim 17, wherein there is at least two cylinders disposed in diagonally opposite relation beneath said die support.

19. Apparatus as defined in claim 16, comprising means for adjusting the fluid pressure supplied to said cylinder in compensating relation to the weight of said die support.

20. Apparatus as defined in claim 17, wherein said cylinders are mounted on a fixed frame member below and in supporting relation to said die support.

21. Apparatus as defined in claim 1, comprising a second die support mounted for vertical movement in cooperation with the first die support, and at least two lift members pivotally connected to said lift lever, at least one of said lift members being pivotally connected to each one of said die supports.

22. Apparatus as defined in claim 21, wherein said die supports are arranged one above the other, and means is provided whereby the lift member for the upper die support may be selectively pivotally connected to said lift lever either eccentrically or concentrically of the pivot of said lift lever.

23. Apparatus as defined in claim 22, wherein the said concentric pivotal connection comprises a pin axially adjustably mounted in a bore in the end of a shaft that forms the lift lever pivot, said pin being extended out of said bore for concentric connection of said lift member for the upper die support to the lift lever, and being retracted within the bore when the lift member for the upper tool support is eccentrically connected to said lift lever.

24. Apparatus as defined in claim 3, wherein said lift lever comprises a first lever arm fixed in a shaft defining said first pivot axis and pivotally connected to said links, a second axially spaced lever arm fixed on the shaft and a motion transmitting member pivoted to said second lever arm and said die support.

25. Apparatus as defined in claim 1, comprising means defining a power unit containing said cam means and a motor for driving said cam means, and wherein said web feed means comprises intermittent feed means driven from said power unit in synchronism with actuation of the die support by said cam means.

26. Apparatus as defined in claim 25, comprising further cam means driven by the motor for intermittently rotating a sprocket at the power unit, and a drive chain connects said sprocket to said intermittent feed means.

27. Apparatus as defined in claim 26 wherein said cam means are all on the same motor driven shaft.

28. Apparatus for manufacturing thin-walled articles comprising means providing a web of thermoplastic material, means for continuously advancing said web, means defining a tempering station for conditioning the web to a temperature suitable for thermal forming, means defining a thermal forming station positioned for receiving said web and wherein successive areas of said web are subjected to shaping feed operation for forming articles of desired shape in the web, feed means intermediate said tempering and thermal forming stations for converting continuous motion of said web into intermittent motion for disposing successive web areas for a predetermined time at said thermal forming station, at least one vertically movable die component in said thermal forming station, means for actuating said web feed means, means for actuating the die shaping component in synchronism with web feed, means for adjusting said actuation of said die component for forming articles of different size in the web, and means for adjusting the web feed for correlating the advance of the web to the operational characterization of the thermal forming station.

29. Apparatus as defined in claim 28 wherein said feed means comprises a compensating roller assembly wherein the web is continuously moved at one side and intermittently moved at the other side, and a common power unit is provided having means connected to said assembly to continuously advance the web at said one side and means connected to said other side for intermittently advancing the web from the loop formed by said compensating roller.

30. Apparatus as defined in claim 29 wherein said power unit has a continuously driven output sprocket connected by a chain to said one side of said assembly and an intermittently driven output sprocket connected by a drive chain to the other side of said assembly, and wherein said sprockets are interchangeable with corresponding sprockets of different numbers of teeth, for altering the speed of movement and the increment of each intermittent web movement.

31. Apparatus as defined in claim 1, comprising means at said thermal forming station for automatically ejecting the web containing the formed articles.

32. Apparatus as defined in claim 31, wherein said ejecting means comprises double acting pressure cylinders mounted at said die support.

* * * * *

UNITED STATES PATENT OFFICE
CERTIFICATE OF CORRECTION

Patent No. 3,836,309    Dated September 17, 1974

Inventor(s) Alfons Wilhelm Thiel

It is certified that error appears in the above-identified patent and that said Letters Patent are hereby corrected as shown below:

Foreign Application Priority Data

December 19, 1972    GERMANY    P 22 62 093.5

Signed and sealed this 7th day of January 1975.

(SEAL)
Attest:

McCOY M. GIBSON JR.    C. MARSHALL DANN
Attesting Officer    Commissioner of Patents